July 2, 1929.  J. R. McGIFFERT  1,719,515
GASOLINE LOCOMOTIVE
Filed Feb. 3, 1926  3 Sheets-Sheet 1

INVENTOR.
John R. McGiffert
BY
Fay, Oberlin & Fay
ATTORNEYS

July 2, 1929.  J. R. McGIFFERT  1,719,515
GASOLINE LOCOMOTIVE
Filed Feb. 3, 1926   3 Sheets-Sheet 2

INVENTOR.
John R. McGiffert
BY
Fay, Oberlin & Fay
ATTORNEYS.

July 2, 1929.  J. R. McGIFFERT  1,719,515
GASOLINE LOCOMOTIVE
Filed Feb. 3, 1926  3 Sheets-Sheet 3

INVENTOR.
John R. McGiffert
BY
Fay, Oberlin & Fay
ATTORNEYS.

Patented July 2, 1929.

1,719,515

UNITED STATES PATENT OFFICE.

JOHN R. McGIFFERT, OF DULUTH, MINNESOTA, ASSIGNOR TO CLYDE IRON WORKS, OF DULUTH, MINNESOTA, A CORPORATION OF MAINE.

GASOLINE LOCOMOTIVE.

Application filed February 3, 1926. Serial No. 85,731.

This invention relating as indicated, to locomotives, has more particular reference to locomotives propelled by internal combustion engines which per se are without numerous speed change ratios reverse as well as forward, and it is among the objects of the invention to provide for reverse speeds as well as forward speeds. A further object is the provision of traction means supplemental to that ordinarily employed. Other objects will appear as the description proceeds.

To the accomplishment of the foregoing and related ends, the invention, then, consists of the means hereinafter fully described, and particularly pointed out in the claims, the annexed drawing and the following description setting forth in detail one approved manner of carrying out the invention, such disclosed mode, however, constituting but several of various ways in which the principle of the invention may be used.

In said annexed drawing:—

Figure 1:
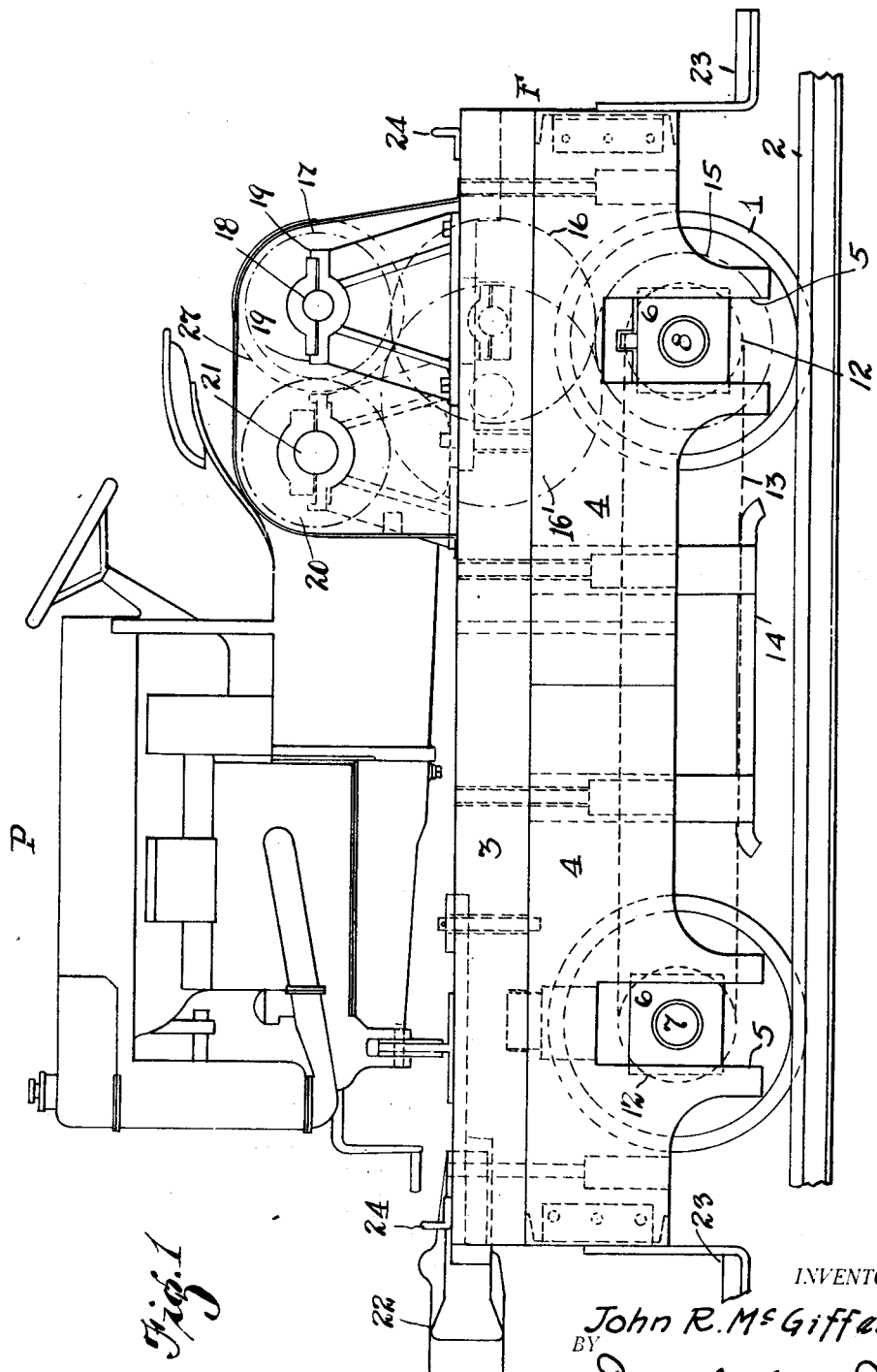
Figure 2:
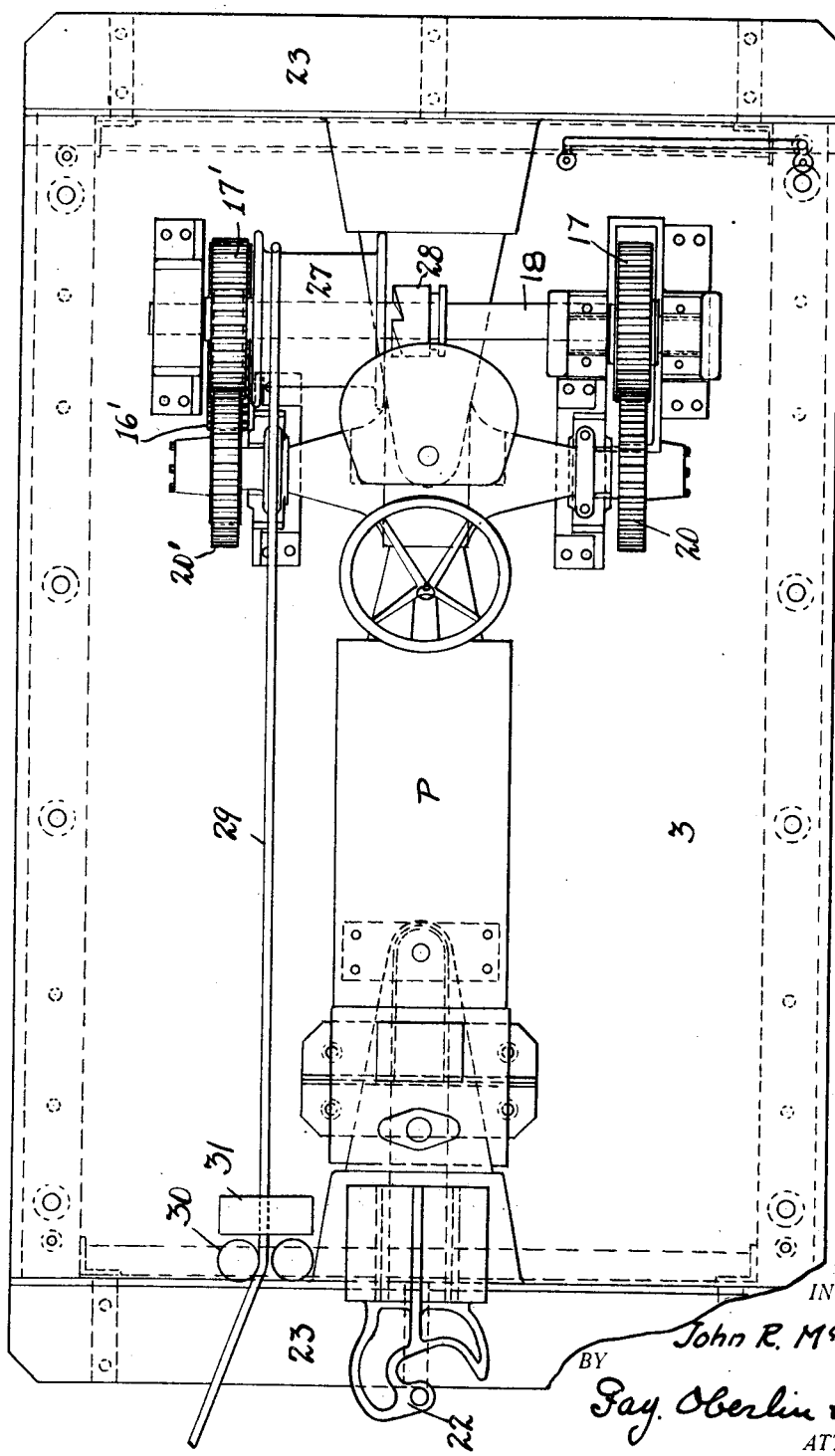
Figure 3:
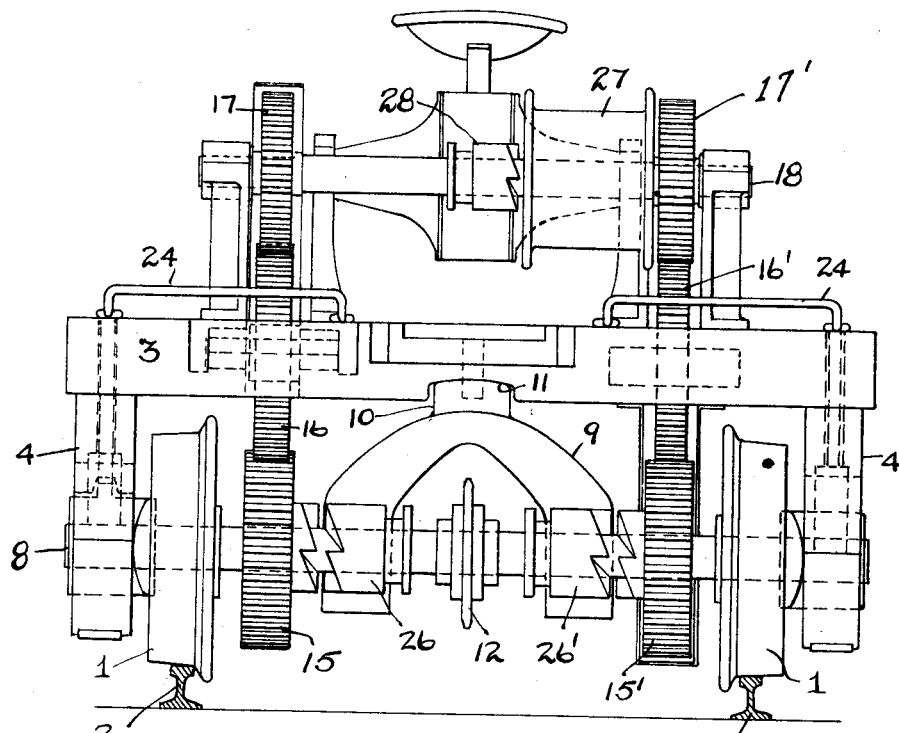

Fig. 1 is a side elevation of a locomotive embodying my invention; Fig. 2 is a plan view; and Fig. 3 is a rear elevation of a modification.

Referring in detail to the drawing, the reference character F designates a frame supported by flanged traction wheels 1 adaptable to a track 2. The frame may be of somewhat varied form as regards its precise detail but conveniently may be made up of a platform 3, preferably a heavy casting, and therebelow pedestals or supports 4 which are provided with recesses or guideways 5 open below, and within which are arranged journal boxes 6 so as to be somewhat slidable within such guides, there being flanges on the guideways, or, if preferred, the boxes may be flanged. In any case, lateral displacement will be prevented, while such adjustment as may be necessary in the vertical plane is allowed for. Within the journal boxes 6 are mounted axles 7, 8 upon which the flanged wheels 1 are secured, the forward axle 7 being also mounted in a yoke 9 which has a projection or tongue 10 somewhat rounded in form and seating within a recess 11 in the platform, the mount being such that a slight lateral rocking of this axle is possible in passing over inequalities of the track. In this manner an even bearing of all of the wheels upon the track is obtained, the rear axle 8 being normally shimmed in the guideways and prevented from rocking. Upon the axles 7 and 8, sprocket wheels 12 may be provided if desired, a sprocket chain 13 connecting these and thus giving traction on all wheels. A guard 14 may be located under the lower run of the chain. The rear axle 8 carries also a gear 15 which meshes in turn with an idler gear 16 mounted on a stub shaft in the frame and the latter gear in turn meshes with a gear 17 secured to a shaft 18 which is mounted in suitable pedestals above the frame. Preferably the journal boxes here are of split type, the upper member seating in a recess in the pedestal flange fore and aft as at 19 although, if preferred, the relationship of the flanges can be reversed, these being located on the upper member of the box instead of on the pedestal. The gear 17 furthermore meshes with a gear 20 which is secured to differential shaft 21 of a power unit P which comprises an internal combustion engine and a gear set and shifting means therefor providing ordinarily three speeds ahead and one reverse. The detail of the power unit may conform more or less to conventional lines and further description may be omitted. A drawhead 22 is shown as provided at the forward end of the locomotive and a similar drawhead may be mounted at the rear if desired, and foot boards 23 and hand holds 24 are arranged for the convenience of switchmen.

The manner of use of the device will be clear from the description foregoing, it being understood that the engine driver may control the power unit about as in the case of an automobile and on shifting the clutch into action (the detail of this not being shown), the locomotive is put into motion, and by means of the gear set in the power unit, the speed desired may be had; for example there may be provision for three speeds forward and one reverse.

In cases where more than one speed reverse will be required, the rear axle 8 carries loosely mounted thereon not only the gear 15 but an additional gear 15' and slidably mounted on splines so as to cooperate with these gears are clutch elements 26 and 26', these being held in spaced relation to each other and manipulated by a clutch throw (the detail of which is not shown) so that either the one or the other, but not both, of the clutches may be brought into engagement with its respective gear at any given time. An additional idler gear 16' is also provided on a stub shaft in the frame, this gear being meshable with a gear 20' on the differential shaft 21, and with the gear 15'. By such means power may be taken from the shaft 21 through gear train 20', 16', 15', thus turning the axle 8 oppositely from the direction incurred in the use of the gear train 20, 17, 16, 15; and all of the speeds provided in the gear set of the power unit may be made available forward or reverse as desired. A gear 17' fixed to the shaft 18 for meshing with the duplicate gear 20 is desirable for equalizing the drive from the differential shaft of the power plant to the shaft 18. A winding drum 27 may be loosely mounted upon shaft 18 and a clutch 28 may be arranged for coaction, being slidably splined upon the shaft so that the drum may be clutched into operation when desired. This feature allows of securing further additional traction or pull in case of a sharp curve or slippery track, etc., a suitable cable 29 being fastened at one end to an anchorage, for instance, a tree, and being passed about the drum so that on clutching it into action, the cable may be wound up and thereby a pull exerted upon the entire device. A guide, preferably made up of rollers 30 and 31 in pairs at right angles to each other may be provided at a convenient location on the frame.

Other modes of applying the principle of my invention may be employed instead of that explained, change being made as regards the means herein disclosed, provided the means stated by any of the following or the equivalent of such stated means be employed.

I therefore particularly point out and distinctly claim as my invention:—

1. In a device of the character described, the combination of a frame, an axle journaled below said frame to the rear, and an axle journaled near the front, one of said axles being journaled in a yoke, said yoke having an upstanding projection which is received in a recess in the frame whereby that axle may be slightly rockable in a plane transverse to the frame, and a motor for driving the other axle.

2. In a device of the character described, the combination of a frame, an axle journaled in said frame below to the rear and an axle journaled near the front, a shaft above said frame, a drum on said shaft, a motor for driving said drum shaft and said rear axle, and means for preventing binding in the driving gearing, said means including a mounting for the front axle slightly rockable in a plane transverse to the frame.

3. In a device of the character described, the combination of a frame, paired guideways in the sides of said frame below, journal boxes in said guideways, two axles journaled in forward and rearward pairs of said boxes, flanged traction wheels secured on said axles, a shaft above said frame, a drum on said shaft, a motor, and gears on said shaft and the rear axle for selectively driving said drum and axle.

4. In a device of the character described, the combination of a frame, a motor-driven shaft, speed-change gearing in connection therewith, axles journaled in said frame, flanged traction wheels secured on said axles, two gears loosely mounted on one of said axles, means for clutching one or the other of said gears to the axle, and gear trains connecting the said gears to said motor-driven shaft for motion in forward or reverse directions respectively.

5. In a device of the character described, the combination of a frame, paired guideways in the sides of said frame below, journal boxes in said guideways, two axles journaled in forward and rearward pairs of said boxes, flanged traction wheels secured on said axles, a gear on the rear axle, an idler gear meshing therewith, a shaft above said frame, a drum and a gear on said shaft, the gear meshing with said idler gear, a motor-driven shaft parallel to said shaft, and a gear on said motor shaft meshing with the gear on the said shaft.

6. In a device of the character described, the combination of a frame, paired guideways in the sides of said frame below, journal boxes in said guideways, two axles journaled in forward and rear pairs of said boxes, flanged traction wheels secured on said axles, two gears loosely mounted on said rear axle, means for clutching one or the other of said gears to the axle, idler gears meshing with said gears, a shaft above said frame, a gear secured on said shaft to mesh with one of said idler gears, a motor-driven shaft parallel to said shaft, and gears on said motor-driven shaft one meshing with the gear on said shaft and the other meshing with one of said idlers.

7. In a device of the character described, the combination of a frame, paired guideways in the sides of said frame below, journal boxes in said guideways, two axles journaled in forward and rear pairs of said boxes, flanged traction wheels secured on said axles, a yoke in which said forward axle is also journaled, said yoke having an upward projection which is received in a recess in the frame, a motor-driven shaft above said frame, and means for transmitting power from said motor-driven shaft to the rear axle.

8. In a device of the character described, the combination of a frame, paired guideways in the sides of said frame below, journal boxes in said guideways, two axles journaled in forward and rear pairs of said boxes, flanged traction wheels secured on said axles, a yoke in which said forward axle is also journaled, said yoke having an upward projection which is received in a recess in the frame allowing slight lateral rocking, a gear on said rear axle, an idler gear meshing with such gear, a shaft above said frame, a gear on said shaft to mesh with said idler gear, a motor-driven shaft parallel to the said shaft and a gear on said motor-driven shaft meshing with the gear on the said shaft.

9. In a device of the character described, the combination of a frame, paired guideways in the sides of said frame below, journal boxes in said guideways, two axles journaled in forward and rear pairs of said boxes, flanged traction wheels secured on said axles, a yoke in which said forward axle is also journaled, said yoke having an upward projection which is received in a recess in the frame allowing slight lateral rocking, two gears loosely mounted on said rear axle, means for clutching one or the other of said gears to the axle, idler gears meshing with said gears, a shaft above said frame, a gear secured on said shaft to mesh with one of said idler gears, a motor-driven shaft, parallel to said shaft, and gears on said motor-driven shaft one meshing with the gear on the said shaft and the other meshing with one of said idlers.

10. In a device of the character described, the combination of a frame, paired guideways in the sides of said frame below, journal boxes in said guideways, two axles journaled in forward and rear pairs of said boxes, flanged traction wheels secured on said axles, a yoke in which said forward axle is also journaled, said yoke having an upward projection which is received in a recess in the frame allowing slight lateral rocking, a drive chain connecting the two axles, two gears loosely mounted on said rear axle, means for clutching one or the other of said gears to the axle, idler gears meshing with said gears, a shaft above said frame, a gear secured on said shaft to mesh with one of said idler gears, a motor-driven shaft parallel to said shaft, and gears on said motor-driven shaft one meshing with the gear on the said shaft and the other meshing with one of said idlers.

11. In a device of the character described, the combination of a frame, paired guideways in the sides of said frame below, journal boxes in said guideways, two axles journaled in forward and rear pairs of said boxes, flanged wheels secured on said axles, a yoke in which said forward axle is also journaled, said yoke having an upward projection which is received in a recess in the frame allowing slight lateral rocking, a drive chain connecting the two axles, two gears loosely mounted on said rear axle, means for clutching one or the other of said gears to the axle, idler gears meshing with said gears, a shaft above said frame, a gear secured on said shaft to mesh with one of said idler gears, a motor-driven shaft parallel to said shaft, means for selectively changing the speed of the motor-driven shaft, gears on said motor-driven shaft one meshing with the gear on the said shaft and the other meshing with one of said idlers, a winding drum loosely mounted on said shaft, and means for clutching said drum to said shaft.

Signed by me this 28th day of January, 1926.

JOHN R. McGIFFERT.